United States Patent [19]
Jo et al.

[11] Patent Number: 5,096,253
[45] Date of Patent: Mar. 17, 1992

[54] CABS OF HEAVY CONSTRUCTION VEHICLES WITH AN OPENABLE FRONT WINDOW AND A LOCKING DEVICE THEREFOR

[75] Inventors: Chun-Ho Jo; Sung-Gi Park; Chun-Jin Youn, all of Changwon, Rep. of Korea

[73] Assignee: Samsung Heavy Industries, Co., Ltd., Seoul, Rep. of Korea

[21] Appl. No.: 705,362

[22] Filed: May 24, 1991

[30] Foreign Application Priority Data

May 31, 1990 [KR] Rep. of Korea ............... 7635
Oct. 19, 1990 [KR] Rep. of Korea ............... 15901

[51] Int. Cl.$^5$ ............................................. B60B 33/06
[52] U.S. Cl. ................................. 296/190; 296/201; 49/41
[58] Field of Search ............... 296/190, 201, 146; 49/41, 40

[56] References Cited

U.S. PATENT DOCUMENTS

| | | | |
|---|---|---|---|
| 2,651,541 | 9/1953 | Surles | 49/41 X |
| 2,819,114 | 1/1958 | Lake | 49/41 X |
| 3,341,247 | 9/1967 | Marlinmaas | 296/190 |
| 4,880,269 | 11/1989 | Jensen et al. | 296/190 |

Primary Examiner—Robert R. Song
Attorney, Agent, or Firm—Nilles & Nilles

[57] ABSTRACT

A cab of a heavy construction vehicle comprising an arc-shaped front wall, an arc-shaped movable front window and arc-shaped guide rails, all of which have substantially the same radius of curvature. During the movement of the front window between its full opening position and full closing position, the movement trace of the front window is present substantially near and along the front wall of the cab so that inner space of the cab may not reduced upon opening and closing of the front window. As a result, there is no danger that the operator may injured by the moving front window. It is also possible to lock the front window at an optionally desired position between its full opening position and full closing position. The cab also comprises a locking device including a plurality of engaging members each provided with a cam surface and an engaging surface and a lock bolt adapted to be slidably contactable with a required engaging member and engagable with the engaging surface of the engaging member. In virtue of the camming of the locking device, locking of the front window can be accomplished simply and surely.

7 Claims, 5 Drawing Sheets

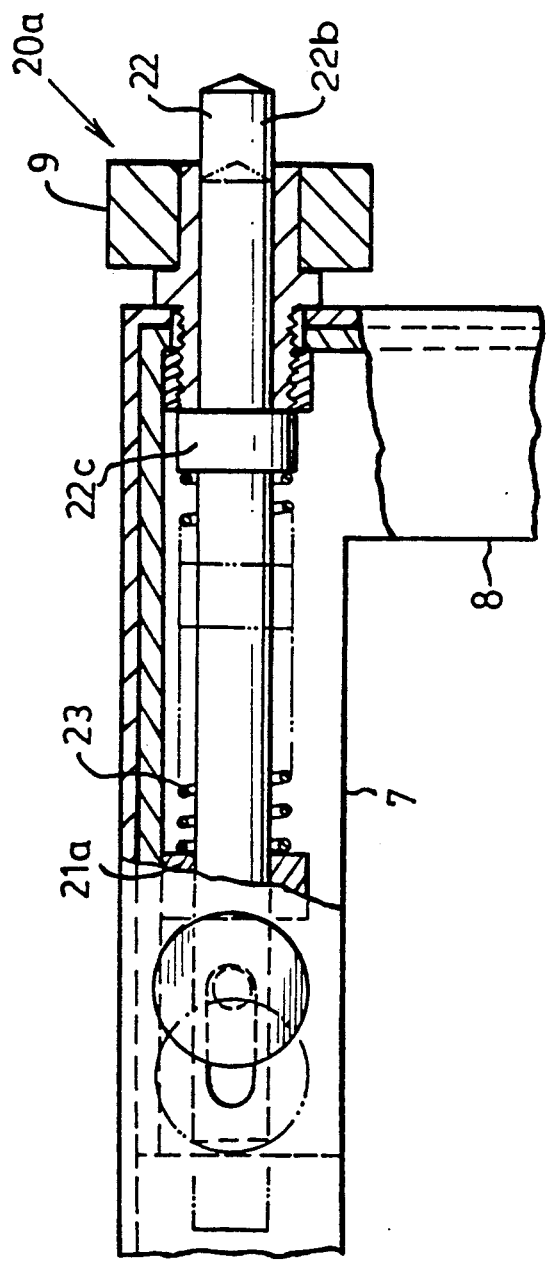

CABS OF HEAVY CONSTRUCTION VEHICLES WITH AN OPENABLE FRONT WINDOW AND A LOCKING DEVICE THEREFOR

BACKGROUND OF THE INVENTION

1. Field of the Invention

The present invention relates to cabs of heavy construction vehicles, and more particularly to cabs of heavy construction vehicles with an openable front window and a locking device therefor.

2. Description of Prior Art

Generally, cabs of heavy construction vehicles such as cranes or excavators have the box shape, side walls of which have openings each provided with a glass window. An example of such type of cabs is shown in FIGS. 4 and 5 and designated by reference numeral 50. In particular, a front wall 51 of the cab 50 has the frontwards protruded shape from a perpendicular plane so that interior of the cab can widen to provide a space for various driving devices and control devices therein. The front wall 51 comprises a flat front wall upper portion 51a inclined rearwards as extending downwardly and a flat front wall lower portion 51b inclined rearwards as extending downwardly from the lower end of said upper portion 51a. The upper portion 51a has an opening provided with a front glass window 52 which is capable of being lifted up to allow the opening to be opened. To this end, The cab 50 includes a pair of guide rails 54 attached to both side of said cab 50 and extending from the lower end of the opening of the front wall upper portion 51a and the upper end of the opening of the front wall upper portion 51a along the side edges of the opening, respectively. To each side edges of the front window 52, a frame 55 is attached which extends throughout the length of said front window 52 and has rollers 56 at its upper and lower ends, respectively. The rollers 56 of the frame 55 are positioned in the guide rails 54 in order to guide the opening/closing movements of the front window 52 by rolling and sliding along the guide rails 54 during opening/closing operations of the front window 52.

However, when the front window 52 of the cab 50 is forced to move upwardly or downwardly in opening/closing operations, upper and lower rollers 56 respectively roll and slide along their straight traces on individual guide rails 54, guide directions of which are different from each other as shown in FIG. 1. Thus, the opening/closing operations may not be carried out smoothly. Also, during the movement, the front window 52 occupies a considerable part of a front space inside the cab 50 as shown in FIG. 5 so that a sufficient space can not be secured between the person operating the vehicle and the moving window. Therefore, there may be a danger that the person is carelessly struck on his body to be injured by the moving window.

Also, the cab 50 is provided with a locking device 60 for locking the window 52 at its desired positions. However, the locking of the front window 52 provided by the locking device 60 are limited only to a full opening position and a full closing position. That is, there is a disadvantage that the front window 52 can not be locked at an optionally desired position between its full opening and closing positions. This is because if the front window 50 is locked at an intermediate position between its full opening and closing positions, it would occupy much front space inside the cab 50.

As shown in FIG. 6, the window locking device 60 of the cab 50 includes a hollow locking member 61 mounted at the upper portion of the window frame 55 and provided with a reversed U-shaped slot 61a. Positioned inside the locking member 61 is a lock bolt shown at 62 which is slidable in said locking member 61. The lock bolt 62 has a handle 62a capable of slidably moving along the reversed U-shaped slot 61a. Also, there is provided a pair of locking apertures 59 perforated through the side wall 58 of the cab 50 in order to lock the window 52 at its full opening and closing positions by receiving a protruding end 62b of the lock bolt 62. But, there is a problem that it is very difficult to accurately align the protruding end 62b of the lock bolt 62 with a desired locking aperture 59 in order to insert the former into the latter for locking the window 52. Also, if the locking was unstable as a result of wear of the locking apertures 59 and the reversed U-shaped slot 61a, the front window 52 will be severely rattled depending upon a vibration of the vehicle during a work on the ground, thereby causing the rattling noise to be generated. Furthermore, the front window may be suddenly dropped or broken.

SUMMARY OF THE INVENTION

It is, therefore, an object of the present invention to provide cab of heavy construction vehicle in which opening/closing operations of its front window can be smoothly carried out and in which a moving trace of the front window does not occupy any space inside of the cab.

It is another object of the present invention to provide cab of heavy construction vehicle of which front window can be locked at any desired position between its full opening full closing positions.

In accordance with the present invention, the above-mentioned objects can be accomplished by providing a cab of a heavy construction vehicle comprising a cab body having the box shape including a base, a top wall, front and rear walls and both side walls, said front, rear and both side walls being provided with openings, respectively, said cab comprising: a front wall having the arc shape, an arc-shaped front window provided at said opening of the front wall and adapted to be movable upwardly and downwardly between its full opening position and full closing position in order to close and open the opening, a pair of arc-shaped frames attached to both side edges of the front window, respectively, and extending throughout the length of the front window, each frame having rollers at upper and lower ends thereof, respectively, a pair of guide rails attached to both sides of the cab body, respectively, and adapted to support the upper and lower rollers in order to guide opening and closing of the front window, each guide rail having the same radius of curvature as that of the front window, and means for locking the front window at a required position between the full opening position and full closing position, said means for locking the front window comprising: a hole laterally formed in the upper end of each of said frames and provided at the intermediate portion thereof with a laterally extending slot, a lock bolt received in said hole to slide therein and provided with a handle externally extending through said slot, said lock bolt carrying said upper roller near its outwardly protruded end, a compression spring adapted to bias the lock bolt in a direction of outwardly projecting the lock bolt, and a plurality of engaging members provided at required positions on each of said guide rail, respectively, and each having a cam surface formed to incline inwardly as extending rearwardly and adapted to be contactable with said outwardly protruded end of the lock bolt upon the movement of the front window and an engaging surface formed at the rear end of said cam surface and adapted to be engagable with the outwardly protruded end of the lock bolt.

BRIEF DESCRIPTION OF THE DRAWINGS

While the novel feature of the invention are set forth with particularity in the appended claims, the invention, both as to organization and content, will be better understood and appreciated, along with other objects and features thereof, from the following detailed description taken in conjunction with the drawings, in which:

FIG. 3B is a longitudinal section view of other embodiment of a locking device in accordance with the present invention;

DETAILED DESCRIPTION OF PREFERRED EMBODIMENTS

Figure 1:
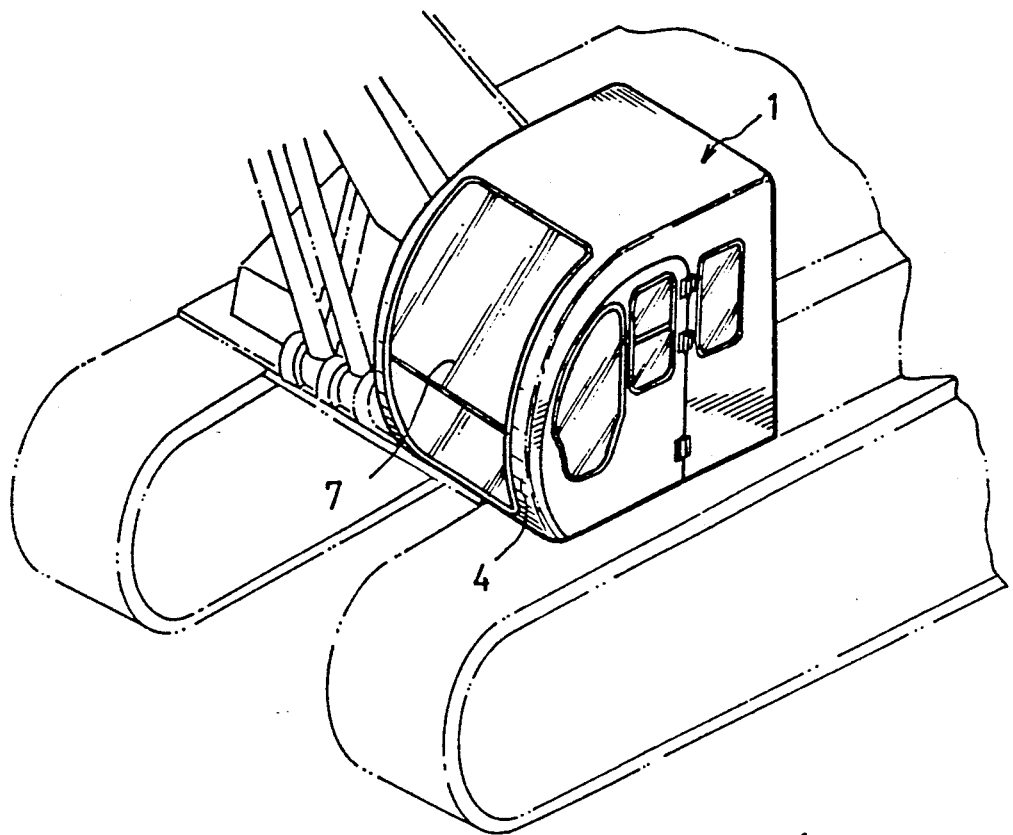
FIG. 1 is a perspective view of a cab of a heavy construction in accordance with the present invention.

A cab of a heavy construction vehicle embodying the present invention is perspectively shown in FIGS. 1 to 3. It has a box-shaped cab body 1, which comprises a base 2, a top wall 3, front and rear walls 4 and 5, and both side walls 6. The front and rear walls 4 and 5 and the both side walls 6 respectively have openings each provided with a glass window. In accordance with the present invention, the front wall 4 of the cab body 1 has the arc shape. Also, an arc-shaped front window 7 is provided at the opening of the front wall 4, and have the arc shape of which the radius of curvature is the same as that of the front wall 4. The arc-shaped front window 7 is movable upwardly and downwardly between its full opening position and full closing position in order to close and open the opening. Attached respectively to both side edges of the front window 7 are a pair of arc-shaped frames 8 which extend throughout the vertical length of the front window 7, and have rollers 9 at upper and lower ends thereof respectively. Especially, the upper rollers 9 are respectively mounted on the lock bolts 22 (FIG. 3) as described hereinafter. Also, there are provided a pair of arc-shaped guide rails 10 which are attached to both sides of the cab body 1, respectively, and adapted to support the upper and lower rollers 9 in order to guide opening and closing of the front window 7, and respectively have the same radius of curvature as that of the front window 7. In accordance with an embodiment of the present invention, each arc-shaped guide rail 10 comprises upper and lower guide rail portions 10a and 10b spaced from each other. The upper guide rail portion 10a extends from the position where the upper end of the front window 7 is positioned when the front window 7 is at its full closing position and to the position where the upper end of the front window 7 is positioned when the front window 7 is at its full opening position. Also, the lower guide rail portion 10b extends from the position where the lower end of the front window 7 is positioned when the front window 7 is at its full closing position and to the position where the lower end of the front window 7 is positioned when the front window 7 is at its full opening position. The upper and lower guide rail portions 10a and 10b respectively have the arc shapes of which each radius of curvature is the same as that of the front window 7. Also, each lower end of the upper and lower guide rails 10a and 10b has the radius of curvature slightly larger than that of each corresponding guide rail portion. Therefore, the front window 7 can be maintained to be in closely contact with edges of the opening of the front wall 4 at its full closing position. Alternatively, even though there is not shown in the drawings, each of said guide rails may comprise a single member extending from the position where the lower end of said front window is positioned when the front window is at its full closing position and to the position where the upper end of said front window is positioned when the front window is at its full opening position.

As described above, the front window 7 moves along the arc-shaped guide rails 10 in its opening and closing movements, thus the moving trace of the front window 7 is not present in the inside space of the cab 1, but is present substantially near and along the front wall 4.

On the other hand, in accordance with the present invention, there is provided a locking device 20 for locking the front window 7 at a required position between the full opening position and full closing position.

Figure 3A:
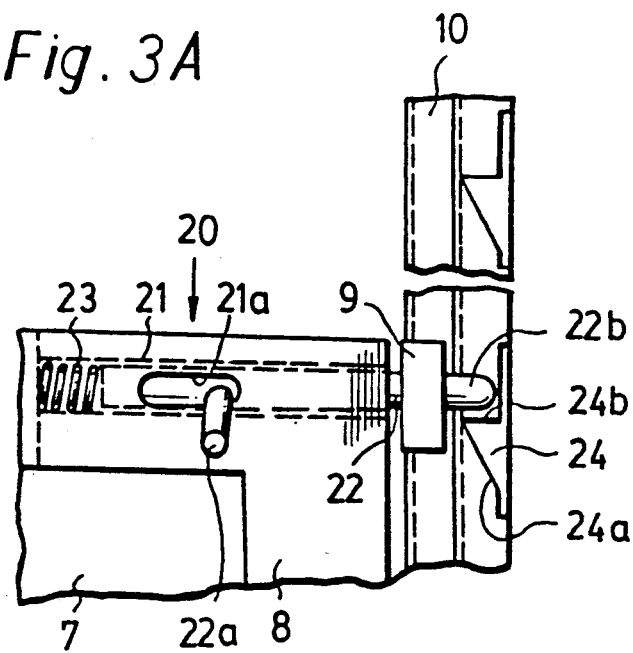
FIG. 3A is a partial front view of an embodiment of a locking device in accordance with the present invention.
Figure 4:
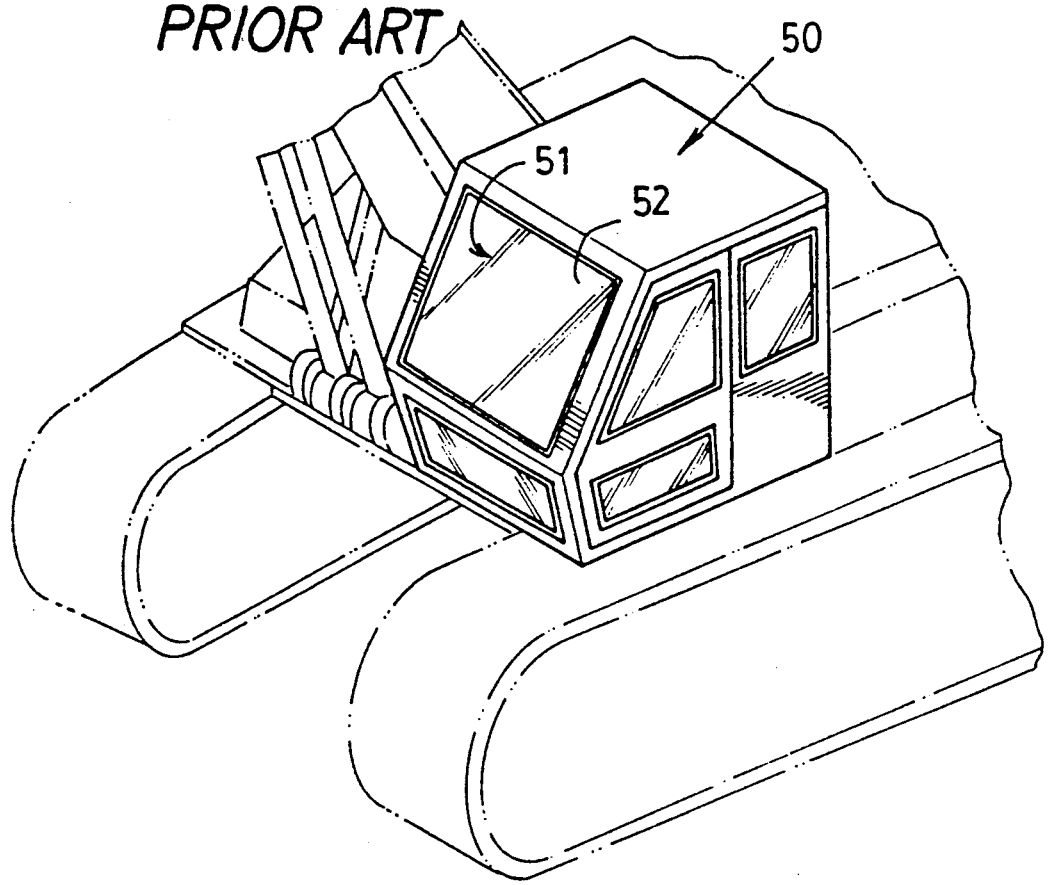
FIG. 4 is a view corresponding to FIG. 1, but showing the prior art.
Figure 5:
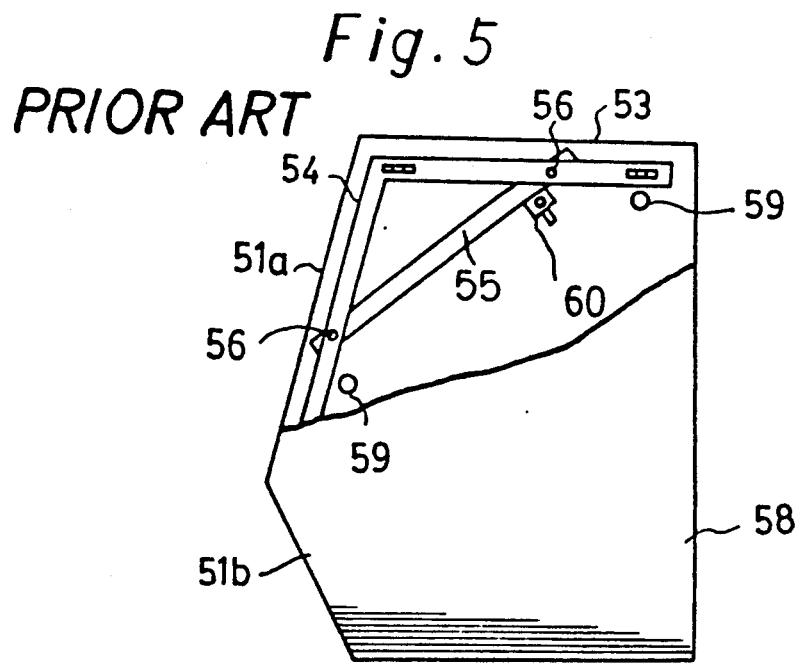
FIG. 5 is a partially broken away side view of the cab of FIG. 4 to show a movement of its front window.
Figure 6:
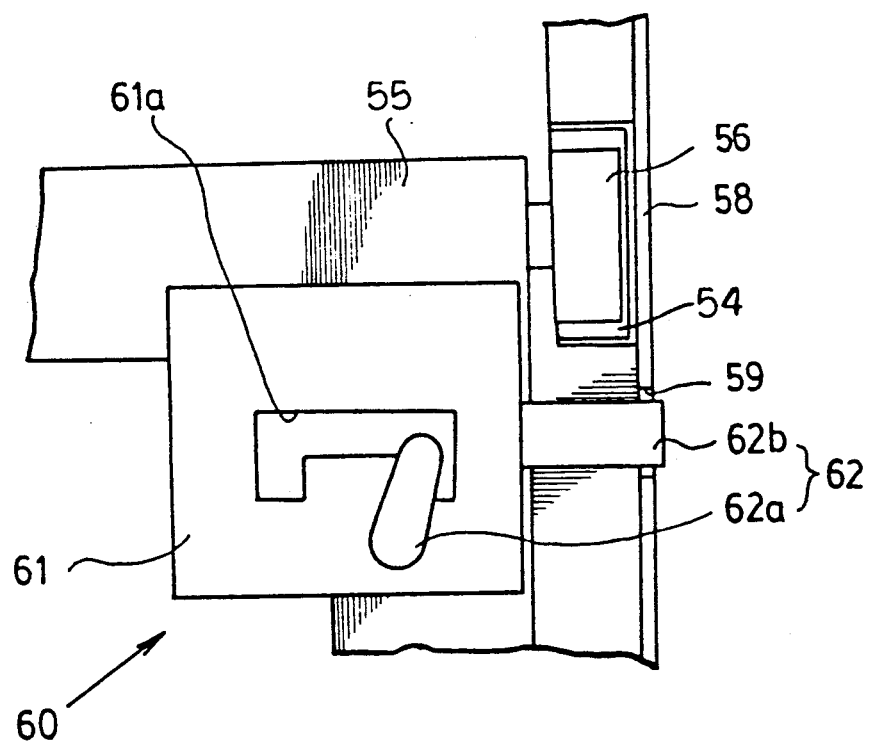
FIG. 6 is a view corresponding to FIG. 3, but showing the prior art.

As shown in FIG. 3A, the locking device 20 includes a hole 21 laterally formed in the upper end of each of the frames 8, and a lock bolt 22 received in said hole to slide therein. The hole 21 is provided at the intermediate portion thereof with a laterally extending slot 21a. Also, the lock bolt 22 is provided with a handle 22a externally extending through the slot 21a, and carries the upper roller 9 near its outwardly protruded end. Enclosed in a space between the inner end of the lock bolt 22 and the inner end surface of the hole 21 facing to said inner end of the lock bolt 22 is a compression spring 23 adapted to bias the lock bolt 22 in a direction of outwardly projecting the lock bolt 22. A plurality of engaging members 24 are formed on the inner surface of each guide rail 10, respectively, in order to lock the front window 7 at required position by interaction with the lock bolt 22. Each engaging member 24 has a cam surface 24a formed to incline inwardly as extending rearwardly and adapted to be contactable with the outwardly protruded end of the lock bolt 22 upon the movement of the front window 7, and an engaging surface 24b formed at the rear end of said cam surface 24a and adapted to be engagable with the outwardly protruded end 22b of the lock bolt 22.

Additionally, as shown in FIG. 3B, it is possible to construct a locking device 20a having the same structure as that of the above-mentioned locking device 20 except the arrangement of the compression spring. This locking device 20a is provided with a spacer 22c fixed to the front portion of the lock bolt 22 near the outwardly protruded end 22b of the lock bolt 22, an annular stopper 21a fixed at rear portion of the inside surface of the hole 21 of the frame 8, said annular stopper 21a having a center opening through which the rear portion of the lock bolt 22 is slidably inserted, and a compression spring 23 located between the spacer 22c and the stopper 21a.

Operation of the cab with the above-mentioned construction according to the present invention will now be described in detail.

Figure 2A:
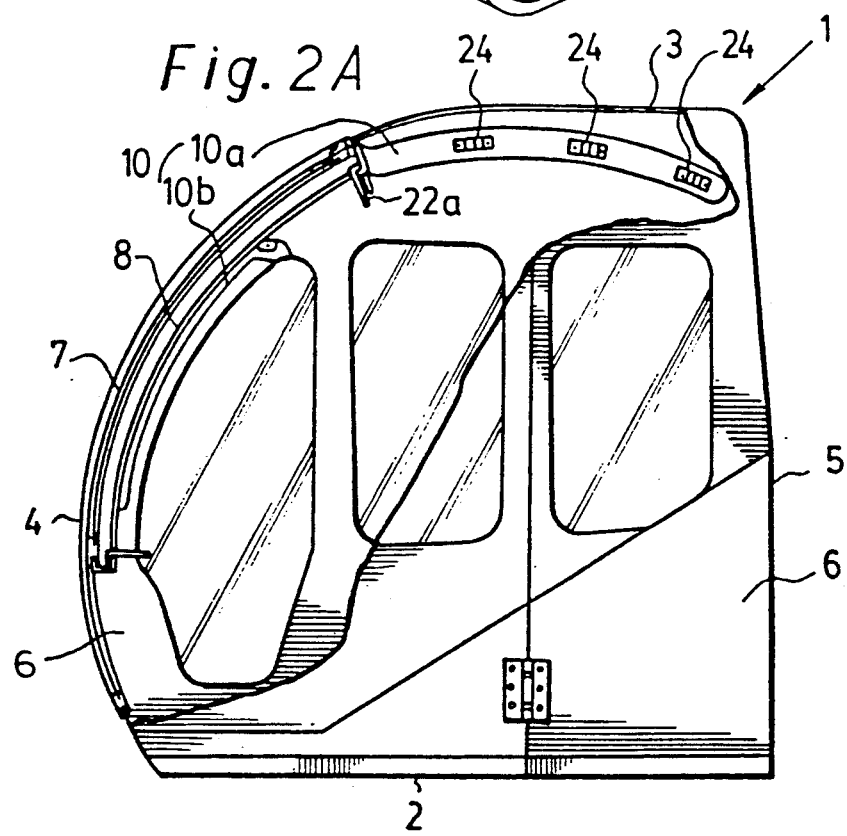
FIG. 2A is a partially broken away side view showing a front window of the cab of FIG. 1 in its full closing position.
Figure 2B:
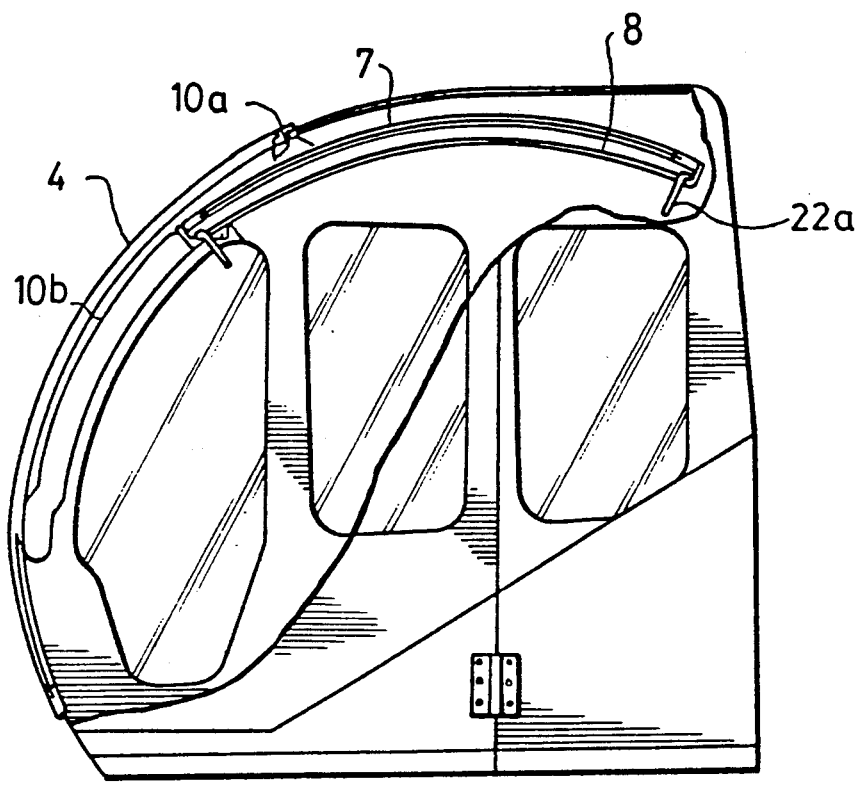
FIG. 2B is a partially broken away side view showing the front window of the cab of FIG. 1 in its full opening position.

As the front window 7 is lifted up from its full closing position shown in FIG. 2A, in order to open the opening of the front wall of the cab, upper and lower rollers 9 mounted to each frame 8 of the front window 7 slide along upper and lower guide rail portions 10a and 10b and guide the movement of the front window 7. When the front window 7 is continuously lifted up after its upper end reached the first engaging member 24 on the upper guide rail portion 10a, the outwardly protruded end 22b of the lock bolt 22 provided at the upper end of the front window 7 slide along the cam surface 24a of said engaging member 24. At this time, the lock bolt 22 is pushed by the cam surface 24a against the biasing force of the compression spring 23. As soon as the outwardly protruded end 22b of the lock bolt 22 passed the end of the cam surface 24a, the lock bolt 22 is projected by the biasing force of the spring 23. At this state, that is the state shown in FIG. 3, the front window 7 can not move toward its full closing position because the outwardly protruded end 22b of the lock bolt 22 is engaged with the engaging surface 24b of the engaging member 24. However, the movement of the front window 7 toward its full opening position is permitted. In such manner, the front window 7 can be moved to its full opening position shown in FIG. 2B and locked at a desired opening position.

For moving the front window 7 locked at its desired opening position to the full closing position, operator should grip and move the handle 22a to slide inwardly the lock bolt 22 against the biasing force of the spring 23 until the outwardly protruded end 22b of the lock bolt 22 is disengaged from the engaging surface 24b of the engaging member 24. At this state, the downward movement of the front window 7 is allowed. In such manner, the front window 7 can be moved to its full closing position shown in FIG. 2A.

During the movement of the front window 7 between its full opening position and full closing position, the movement trace of the front window 7 is present substantially near and along the front wall 4 of the cab. As a result, there is no danger that the operator may injured by the moving front window 7.

As apparent from the above description, the cab of the present invention comprises an arc-shaped front wall, an arc-shaped front window and arc-shaped guide rails, all of which have substantially the same radius of curvature, so that inner space of the cab may not reduced upon opening and closing of the front window. As a result, there is no danger that the operator may injured by the moving front window. It is also possible to lock the front window at an optionally desired position between its full opening position and full closing position. In addition, such locking of the front window can be accomplished simply and surely, in virtue of the camming of the locking device in accordance with the present invention.

Although the preferred embodiment of the invention has been disclosed for illustrative purpose, those skilled in the art will appreciate that various modifications and additions are possible, without departing from the scope and spirit of the invention as disclosed in the accompanying claims.

What is claimed is:

1. A cab of a heavy construction vehicle comprising a cab body having the box shape including a base, a top wall, front and rear walls and both side walls, said front, rear and both side walls being provided with openings, respectively, said cab characterized by:
   said front wall having the arc shape;
   an arc-shaped front window provided at said opening of the front wall and adapted to be movable upwardly and downwardly between its full opening position and full closing position in order to close and open the opening;
   a pair of arc-shaped frames attached to both side edges of said front window, respectively, and extending throughout the length of the front window, each frame having rollers at upper and lower ends thereof, respectively;
   a pair of guide rails attached to both sides of said cab body, respectively, and adapted to support said upper and lower rollers in order to guide opening and closing of the front window, each guide rail having a radius of curvature corresponding to a radius of curvature of the front window; and
   means for locking the front window at a required position between the full opening position and full closing position.

2. A cab of a heavy construction vehicle in accordance with claim 1, wherein said locking means comprises a hole laterally formed in the upper end of each of said frames and provided at the intermediate portion thereof with a laterally extending slot, a lock bolt received in said hole to slide therein and provided with a handle externally extending through said slot, said lock bolt carrying said upper roller near its outwardly protruded end, a compression spring for biasing the lock bolt in a direction of outwardly projecting the lock bolt, and a plurality of engaging members provided at required positions on each of said guide rail, respectively, and each having a cam surface formed to incline inwardly as extending rearwardly and adapted to be contactable with said outwardly protruded end of the lock bolt upon the movement of the front window and an engaging surface formed at the rear end of said cam surface and adapted to be engagable with the outwardly protruded end of the lock bolt.

3. A cab of a heavy construction vehicle in accordance with claim 2, wherein said compression spring is disposed between an inner end of said lock bolt and an inner end surface of said hole facing to said inner end of the lock bolt.

4. A cab of a heavy construction vehicle in accordance with claim 2, wherein said lock bolt has a spacer fixed to a front portion thereof near said outwardly protruded end, and said hole has an annular stopper fixed at rear portion of inside surface thereof, said annular stopper having a center opening through which a rear portion of said lock bolt is slidably inserted, and said compression spring is located between said spacer and said stopper.

5. A cab of a heavy construction vehicle in accordance with claim 1 or claim 2, wherein each of said guide rails comprises an upper guide rail portion extending from the position where the upper end of said front window is positioned when the front window is at its full closing position and to the position where the upper end of said front window is positioned when the front window is at its full opening position, and a lower guide rail portion extending from the position where the lower end of said front window is positioned when the front window is at its full closing position and to the position where the lower end of said front window is positioned when the front window is at its full opening position.

6. A cab of a heavy construction vehicle in accordance with claim 1 or claim 2, wherein each of said guide rails comprises a single member extending from the position where the lower end of said front window is positioned when the front window is at its full closing position and to the position where the upper end of said front window is positioned when the front window is at its full opening position.

7. A cab of a heavy construction vehicle in accordance with claim 5, wherein each lower end of said upper and lower guide rail portions has the radius of curvature slightly larger than that of each corresponding guide rail portion.

* * * * *